United States Patent [19]

Kaylor et al.

[11] Patent Number: 5,305,333
[45] Date of Patent: Apr. 19, 1994

[54] METHOD AND APPARATUS FOR AMPLITUDE MODULATION OF LASER LIGHT

[75] Inventors: William R. Kaylor, Morristown; Allen H. Boardman, Maryville, both of Tenn.

[73] Assignee: North American Philips Corporation, New York, N.Y.

[21] Appl. No.: 999,075

[22] Filed: Dec. 31, 1992

[51] Int. Cl.⁵ ................................. H01S 3/13
[52] U.S. Cl. ........................... 372/31; 372/26
[58] Field of Search ................ 372/94, 26, 31, 29

[56] References Cited

U.S. PATENT DOCUMENTS

| | | | |
|---|---|---|---|
| 4,815,851 | 3/1989 | Soohoo | 372/94 |
| 4,921,354 | 5/1990 | Soohoo | 372/94 |
| 5,112,128 | 5/1992 | Soohoo et al. | 372/94 |

Primary Examiner—Leon Scott, Jr.
Attorney, Agent, or Firm—Edward W. Goodman

[57] ABSTRACT

Using the interferometer technique, a laser light beam is split into two beams one of which is directed along a first light path having a fixed length and the other is directed along a second light path having a variable length. The length of the second light path is varied by a mirror assembly mounted on a piezoelectric block, the length of which is controlled by a modulation signal corresponding to the desired information signal. When the two light beams are recombined at the ends of the first and the second light paths, the varying of the length of the second light path results in a variable phase of the second light beam with respect to the first light beam that is modulation signal dependent at the precise point of recombination of the first and second light beams. The effect of the variable phase combination of the first and second light beams is a vectorial phase addition, the resultant laser light beam after this vectorial combination being intensity (amplitude) modulated by the modulation signal.

6 Claims, 1 Drawing Sheet

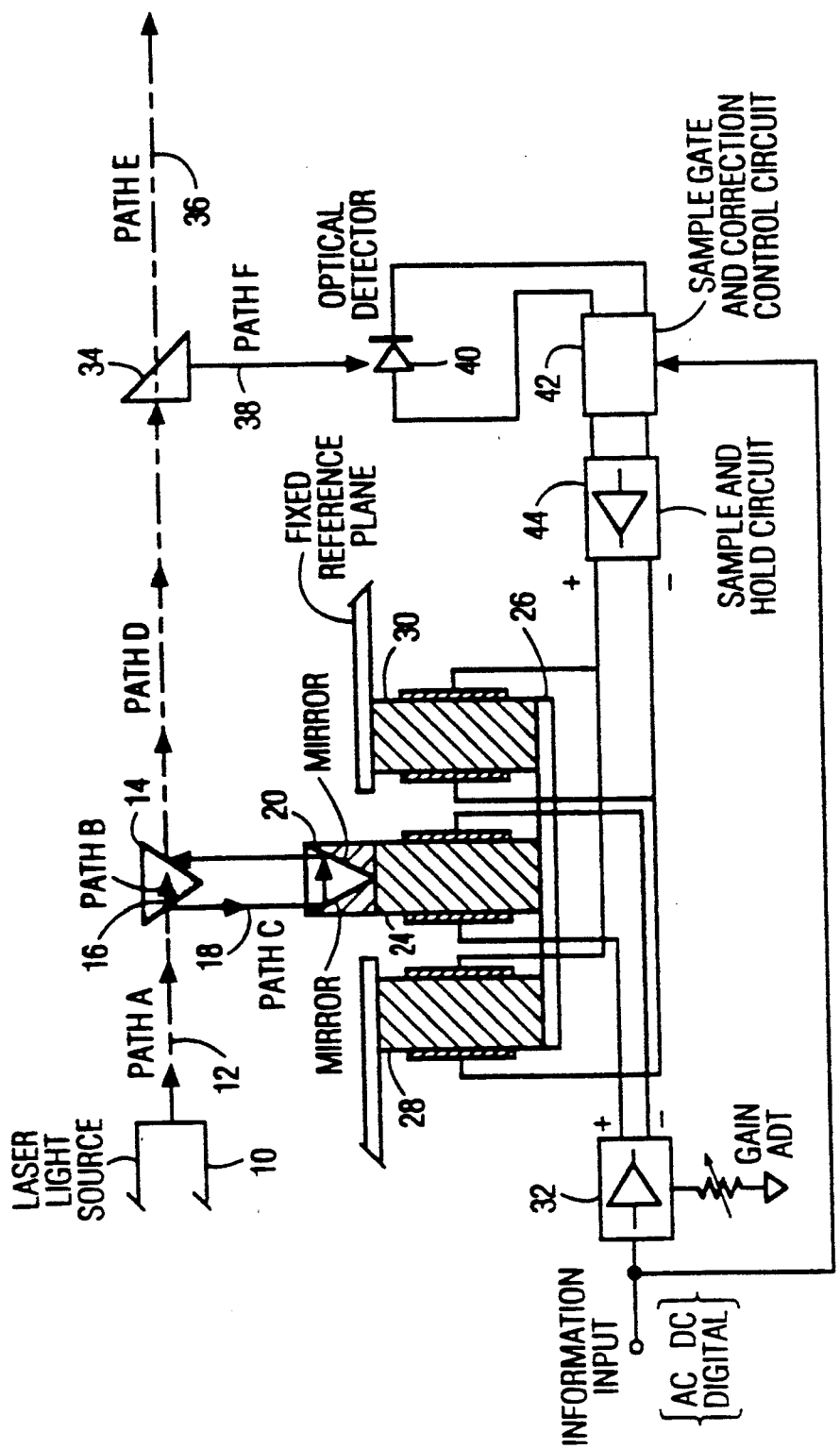

METHOD AND APPARATUS FOR AMPLITUDE MODULATION OF LASER LIGHT

BACKGROUND OF THE INVENTION

1. Field of the Invention

The subject invention relates to the transmission of signals by modulating laser light, wherein this modulation is detected at a receiver thereby recovering the transmitted signals.

2. Description of the Related Art

Previous modulation schemes for laser light used solid state devices for the source in which the power to the device is modulated. These devices are non-linear by nature and it is difficult to derive significant amounts of modulated energy from these devices.

SUMMARY OF THE INVENTION

It is an object of the present invention to significantly increase the amounts of modulated light energy available by allowing the use of high power alternate laser light sources.

It is a further object of the present invention to enable modulating the laser light while maintaining constant the power output from the laser light source.

These objects are achieved in a method for amplitude modulation of laser light comprising providing a laser light beam, splitting said laser light beam into a first light beam and a second light beam, directing said first light beam along a first light path having a fixed length and said second light beam along a second light path having a variable length, providing information signals to be transmitted by said laser light beam, generating a modulation signal in dependence on said information signals, varying the length of said second light path in dependence on said modulation signal, and recombining said first and said second light beams at the ends of said first and said second light paths, whereby the varying of the length of the second light path results in a variable phase of the second light beam with respect to the first light beam that is modulation signal dependent at the precise point of recombination of the first and second light beams. The effect of the variable phase combination of the first and second light beams is a vectorial phase addition, the resultant laser light beam after this vectorial combination being intensity (amplitude) modulated by the modulation signal.

An apparatus for performing the above method comprises a laser light source for providing a laser light beam, means for splitting said laser light beam into a first light beam and a second light beam, means for directing said first light beam along a first light path having a fixed length and said second light beam along a second light path having a variable length, a signal source for providing information signals to be transmitted by said laser light beam, means coupled to said signal source for generating a modulation signal in dependence on said information signals, means for varying the length of said second light path in dependence on said modulation signal, and means for recombining said first and said second light beams at the ends of said first and said second light paths whereby the varying of the length of the second light path results in an amplitude modulation of said laser light beam.

The subject invention is based on the interferometer technique in which for detecting distances, a light beam is split, the path of one of the light beams is varied, and recombining the light beams causing an interference pattern which may then be detected for determining the distance. Applicant has found that by using such a technique, laser light beams from high powered laser sources may be modulated without varying the power to the laser source. This then provides linearity and stability to the arrangement.

BRIEF DESCRIPTION OF THE DRAWINGS

With the above and additional objects and advantages in mind as will hereinafter appear, the invention will be described with reference to the accompanying drawing, in which the sole FIGURE shows a block schematic diagram of the invention.

DESCRIPTION OF THE PREFERRED EMBODIMENTS

As shown in the FIGURE, a laser light source 10 generates a laser light beam 12 which is directed along light path A. A beam splitter 14 splits the laser light beam 12 into a first light beam 16, which travels horizontally through the beam splitter 14 along a light path B, and a second light beam 18, which travels vertically downward away from the beam splitter 14 along a light path C. In order to achieve maximum modulation, it is preferable that the first and second light beams 16 and 18 have the same intensity. Light path C includes a mirror arrangement 20 which reflects the second light beam 18 back to the beam splitter 14 where it is recombined with the first light beam 16. The resultant laser light beam 22 then travels along light path D.

In order to vary the length of the light path C, the mirror arrangement 20 is mounted to an end of an actuator in the form of a block 24 of piezoelectric material, the opposite end thereof being mounted in the center of a intermediate base plane 26. The opposite ends of the intermediate base plane 26 are then attached to a fixed reference plane by two blocks 28 and 30 of piezoelectric material. The three blocks 24, 28 and 30 are the same size and have equal mass.

An information signal source (not shown) provides information signals for modulating the laser light beam. These signals, which may be analog or digital, are applied through a wide band amplifier 32 to the block 24 resulting in the length thereof being varied through electrostrictive motion. It is important that the electrostrictive motion of block 24 be limited to no more than ¼ the wavelength of the laser light.

The blocks 28 and 30 are provided to compensate for any thermal expansion of block 24 and to provide electrostrictive "fine tuning" of the length of the light path C. To this end, the recombined laser light beam 22 in the light path D is applied to a second beam splitter 34 forming a third light beam 36 which travels along light path E, and a fourth light beam 38 which travels vertically along light path F. This fourth light beam 38 is applied to an optical detector 40 which is coupled to a sample gate and correction control circuit 42. The electrical energy derived from the optical detector 40 is sampled only during those times when an information signal is not present. Hence, the sample gate and correction control circuit 42 has the input information signal applied thereto as a control signal. The sample gate and correction control circuit 42 includes a memory for storing a previous sample and if the present sample is substantially different from the stored sample, indicative of thermal expansion of the block 24, a D.C. correction voltage is applied, through sample-and-hold circuit 44, to the blocks 28 and 30. This same procedure is also used to electrostrictively fine tune the quiescent length light path C by adjusting for maximum signal output or null, whichever is desired.

Numerous alterations and modifications of the structure herein disclosed will present themselves to those skilled in the art. However, it is to be understood that the above described embodiment is for purposes of illustration only and not to be construed as a limitation of the invention. All such modifications which do not depart from the spirit of the invention are intended to be included within the scope of the appended claims.

What is claimed is:

1. An apparatus for amplitude modulation of laser light comprising:
   a laser light source for providing a laser light beam;
   means for splitting said laser light beam into a first light beam and a second light beam;
   means for directing said first light beam along a first light path having a fixed length and said second light beam along a second light path having a variable length;
   a signal source for providing information signals to be transmitted by said laser light beam;
   means coupled to said signal source for generating a modulation signal having an amplitude which changes in dependence on said information signals;
   means for varying the length of said second light path in dependence on changes in the amplitude of said modulation signal; and
   means for recombining said first and said second light beams at the ends of said first and said second light paths whereby the varying of the length of the second light path results in an amplitude modulation of said laser light beam, wherein said means for varying the length of said second light path comprises a mirror assembly coupled to actuator means for changing an electrical signal to a mechanical displacement, said actuator means displacing said mirror assembly over a distance which varies in accordance with the changes in the amplitude of said modulation signal.

2. An apparatus as claimed in claim 1, wherein said actuator means comprises a block of piezoelectric material.

3. An apparatus as claimed in claim 2, wherein said apparatus further comprises means for compensating for thermal expansion of said block of piezoelectric material, and for fine tuning the length of said second light path.

4. An apparatus as claimed in claim 3, wherein said means for compensating and for fine tuning comprises:
   a floating intermediate plane attached at a central position to an end of said block of piezoelectric material opposite from said mirror assembly;
   a pair of further blocks of piezoelectric material substantially the same size and mass of said block of piezoelectric material, said further blocks being attached at one respective end to opposite ends of said floating intermediate plane, and at the other respective end to a fixed reference plane;
   means for splitting the amplitude modulated laser light beam into a third and a fourth light beam;
   means for optically detecting the fourth light beam; and
   a circuit for receiving an output from said means for optically detecting said fourth light beam and for generating a correction signal in response to a difference between said output and a previously stored signal.

5. An apparatus as claimed in claim 4, wherein said correction circuit is only operative when said input information signals are not present.

6. An apparatus for amplitude modulation of laser light comprising:
   a laser light source for providing a laser light beam;
   means for splitting said laser light beam into a first light beam and a second light beam;
   means for directing said first light beam along a first light path having a fixed length and said second light beam along a second light path having a variable length;
   a signal source for providing information signals to be transmitted by said laser light beam;
   means coupled to said signal source for generating a modulation signal having an amplitude which changes in dependence on said information signals;
   means for varying the length of said second light path in dependence on changes in the amplitude of said modulation signal; and
   means for recombining said first and said second light beams at the ends of said first and said second light paths whereby the varying of the length of the second light path results in an amplitude modulation of said laser light beam, wherein said first light beam and said second light beam, formed by said means for splitting said laser light beam into a first light beam and a second light beam, are of equal intensity.

* * * * *